(12) United States Patent
Hsu et al.

(10) Patent No.: US 9,823,388 B2
(45) Date of Patent: Nov. 21, 2017

(54) COMPOSITE SUBSTRATE STRUCTURE AND TOUCH-SENSITIVE DEVICE

(71) Applicant: TPK Touch Solutions (Xiamen) Inc., Xiamen (CN)

(72) Inventors: I-Chung Hsu, Taipei (TW); Kuo-Shu Hsu, New Taipei (TW); Chunyong Zhang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 21 days.

(21) Appl. No.: 14/826,226

(22) Filed: Aug. 14, 2015

(65) Prior Publication Data

US 2016/0054477 A1    Feb. 25, 2016

(30) Foreign Application Priority Data

Aug. 21, 2014  (CN) .......................... 2014 1 0414518

(51) Int. Cl.
| | |
|---|---|
| *G02B 1/115* | (2015.01) |
| *G02B 5/02* | (2006.01) |
| *G02B 1/04* | (2006.01) |
| *G02B 1/18* | (2015.01) |
| *B32B 33/00* | (2006.01) |
| *G06F 3/041* | (2006.01) |

(52) U.S. Cl.
CPC .............. *G02B 1/115* (2013.01); *B32B 33/00* (2013.01); *G02B 1/04* (2013.01); *G02B 1/18* (2015.01); *G02B 5/0221* (2013.01); *G02B 5/0278* (2013.01); *G06F 3/041* (2013.01); *G06F 2203/04103* (2013.01)

(58) Field of Classification Search
CPC .. G02B 1/10; G02B 1/11; G02B 1/111; G02B 1/113; G02B 1/115; G02B 1/118; G02B 1/14; G02B 1/18; G02B 5/28; G02B 5/281; G02B 5/282; G02B 5/285; G02B 5/286; G02B 5/287
See application file for complete search history.

(56) References Cited

U.S. PATENT DOCUMENTS

| | | | |
|---|---|---|---|
| 2011/0234529 A1* | 9/2011 | Lee .................... | G06F 3/044 345/174 |
| 2012/0028005 A1* | 2/2012 | Zheng ................. | C09D 5/1693 428/212 |
| 2012/0107614 A1* | 5/2012 | Blum .................. | B05D 5/083 428/411.1 |
| 2013/0107246 A1* | 5/2013 | Yang .................. | G02B 5/208 356/51 |
| 2013/0135741 A1* | 5/2013 | Lee .................... | G02B 1/11 359/580 |

* cited by examiner

*Primary Examiner* — Kimberly N Kakalec
(74) *Attorney, Agent, or Firm* — Paul Bendemire

(57) ABSTRACT

A composite substrate structure includes a transparent substrate, an anti-reflective layer, and an anti-glare layer. The anti-reflective layer is disposed on the transparent substrate and has at least a first anti-reflective film and the refractive index of the first anti-reflective film is greater than that of the transparent substrate. The anti-glare layer is disposed on the anti-reflective layer, and the anti-glare layer and the transparent substrate are respectively located at two opposite sides of the anti-reflective layer. The refractive index of the anti-glare layer is less than that of the first anti-reflective film, and the anti-glare layer has a rough surface distant from the anti-reflective layer.

20 Claims, 3 Drawing Sheets

COMPOSITE SUBSTRATE STRUCTURE AND TOUCH-SENSITIVE DEVICE

CROSS REFERENCE TO RELATED APPLICATIONS

This Non-provisional application claims priority under 35 U.S.C. §119(a) on Patent Application No(s). CN201410414518.X filed in People's Republic of China on Aug. 21, 2014, the entire contents of which are hereby incorporated by reference.

BACKGROUND OF THE INVENTION

Technical Field

The disclosure relates to a composite substrate structure and a touch-sensitive device and, in particular, to a composite substrate structure and a touch-sensitive device with anti-reflection, anti-glare, anti-smudge, and abrasion resistance properties.

Description of the Related Art

Currently, touchscreens are displays and input devices which are often applied to smart phones, tablet computers, notebooks, and various electronic products. As to display function, due to different structural designs of the touchscreens, the quality may be affected by problems of reflection and glare on a screen portion of the touchscreen when watching the screen.

SUMMARY OF THE DISCLOSURE

Therefore, an aspect of the disclosure is to provide a composite substrate structure which includes a transparent substrate, an anti-reflective layer, and an anti-glare layer. The anti-reflective layer is disposed on the transparent substrate and has at least a first anti-reflective film and the refractive index of the first anti-reflective film is greater than that of the transparent substrate. The anti-glare layer is disposed on the anti-reflective layer, and the anti-glare layer and the transparent substrate are respectively located at two opposite sides of the anti-reflective layer. The refractive index of the anti-glare layer is less than that of the first anti-reflective film, and the anti-glare layer has a rough surface distant from the anti-reflective layer. The composite substrate structure may provide the efficacy of anti-reflection and anti-glare by the anti-reflective layer and the anti-glare layer.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION

The present disclosure will be apparent from the following detailed description, which proceeds with reference to the accompanying drawings, wherein the same references relate to the same elements.

Figure 1:
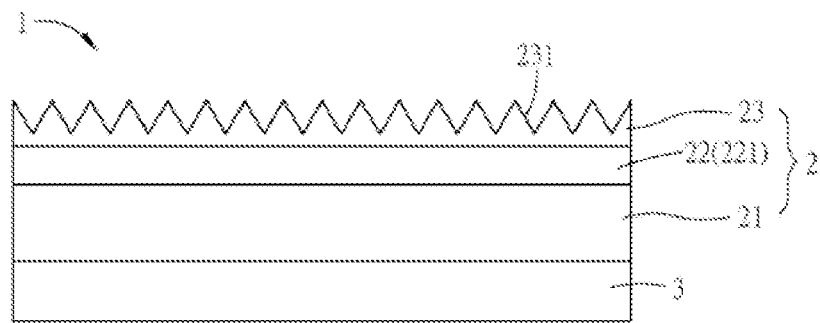
FIG. 1 is a schematic diagram illustrating some embodiments of the touch-sensitive device according to the disclosure.

First Device:

FIG. 1 is a diagram of a touch-sensitive device 1 according to various embodiments of the disclosure. The touch-sensitive device 1 may be applied to smart phones, tablet computers, notebooks, display devices, and so on, but it is not limited thereto.

Specifically, the touch-sensitive device 1 includes a composite substrate structure 2 and a touch-sensing unit 3. The touch-sensing unit 3 is disposed below the composite substrate structure 2, which includes a transparent substrate 21, an anti-reflective layer 22, and an anti-glare layer 23.

In some embodiments, the transparent substrate 21 is formed of glass to act as a structure of a cover glass of the touch-sensitive device 1. In various embodiments, the transparent substrate 21 is formed instead of ethylene terephthalate, polyethersulfone, polyacrylate, polyethylene naphthalate, polyphenylene sulfide, polyallyl, polycarbonate, polyethylene terephthalate, or other hard or flexible materials, without limitation to the specific materials listed.

The anti-reflective layer 22 is disposed on the transparent substrate 21 and includes a first anti-reflective film 221. The refractive index of the first anti-reflective film 221 is greater than that of the transparent substrate 21, and the preferred range of the thickness is between about 225 nm and about 255 nm. Therefore, the reflected light can form destructive interference resulting from the characteristic of the refractive index and the setting of the thickness, so as to effectively reduce the intensity of the reflected light and provide the anti-reflection effect.

Furthermore, the first anti-reflective film 221 of the embodiment is formed from niobium oxide, titanium oxide, tantalum oxide, silicon oxynitride, silicon nitride, or other materials by evaporation or sputtering. According to the selection of the materials, the range of the refractive index of the first anti-reflective film 221 is greater than about 1.8, so that the preferred effect of anti-reflection can be obtained. However, in various embodiments, the material, the refractive index, the thickness, and the manufacturing method of the first anti-reflective film 221 are optionally adjusted, and they are not limited to the disclosure here.

The anti-glare layer 23 is disposed on the anti-reflective layer 22, and the anti-glare layer 23 and the transparent substrate 21 are respectively located at two opposite sides of the anti-reflective layer 22. The anti-glare layer 23 has a rough surface 231, the refractive index of the anti-glare layer 23 is less than that of the first anti-reflective film 221, and the thickness of the anti-glare layer 23 is not greater than about 100 nm.

In some embodiments, the anti-glare layer 23 is formed from silicon oxide or other materials by spraying together with etching accordingly to form the rough surface 231. The surface roughness of the rough surface 231 is not greater than about 100 nm, and its value is not greater than the thickness of the anti-glare layer 23. Exposed to the light, the rough surface 231 will result in light scattering. Therefore, when a user watches the touch-sensitive device 1, the glare problem is alleviated. However, it is noted that, in some embodiments, although the rough surface 231 is illustrated by a regularly undulating shape, the surface morphology of the rough surface 231 is not limited thereto. It may be a regularly or an irregularly undulating rough surface, and it is not limited to the drawings.

In addition, according to the material used for the anti-glare layer 23 of the embodiment, the refractive index of the anti-glare layer 23 is less than about 1.5, so the refractive index of the anti-glare layer 23 is less than that of the first anti-reflective film 221. Moreover, in some embodiments, the preferred thickness of the anti-glare layer 23 is not greater than about 100 nm. Therefore, in such embodiments, the anti-glare layer 23 not only has the foresaid anti-glare function, but also forms a composite anti-reflective structure with the first anti-reflective film 221 due to the anti-glare 23 having refractive index and thickness matching the first anti-reflective film 221, so as to provide the anti-glare and anti-reflection effect simultaneously.

On the other hand, the touch-sensing unit 3 is disposed on the other side of the transparent substrate 21, on which the anti-reflective layer 22 and the anti-glare layer 23 are not disposed. The touch-sensing unit 3 includes at least a black mask, a touch sensing electrode, a signal transmission circuit to provide the function of touch sensing.

Therefore, according to various embodiments, as to the touch-sensitive device 1, the problems of reflection and glare caused by exposing the touch-sensitive device 1 to light are alleviated due to the anti-reflective layer 22 and the anti-glare layer 23, so as to improve the quality of use.

Figure 2:
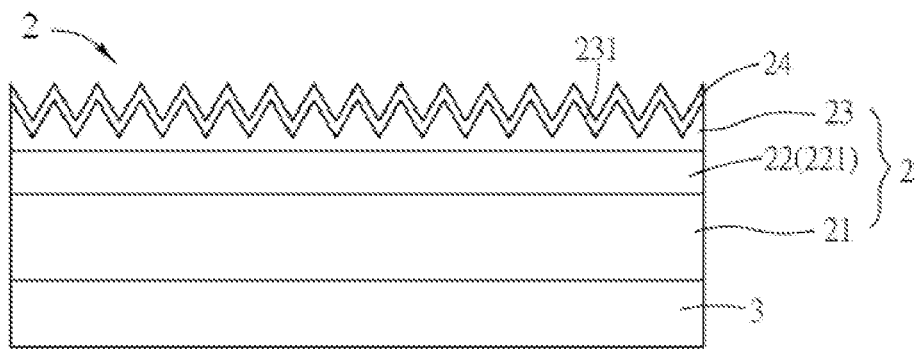
FIG. 2 is a schematic diagram illustrating some embodiments of the touch-sensitive device according to the disclosure.

Second Device:

FIG. 2 is a diagram of the touch-sensitive device 2 according to various embodiments of the disclosure. Compared with some embodiments, the touch-sensitive device 2 of FIG. 2 further includes an anti-smudge layer 24. The anti-smudge layer 24 has hydrophobicity, and thickness of the anti-smudge layer 24 less than thickness of the anti-glare layer 23. The anti-smudge layer 24 is disposed on the rough surface 231 of the anti-glare layer 23, and the anti-smudge layer 24 and the anti-reflective layer 22 are respectively located at two opposite sides of the anti-glare layer 23. Therefore, when a user slides his/her finger or a stylus on a surface of the touch-sensitive device 2, the touch-sensitive device 2 is less prone to being smudged or damaged.

In some embodiments, the anti-smudge layer 24 mainly uses organic siloxane or organic perfluoropolyether as its material and the anti-smudge layer 24 is formed by spraying, evaporation, or sputtering. These materials have properties of hydrophobicity and abrasion resistance, and have contact angle greater than about 90°. Therefore, the adhesion of dirty substances can be reduced to provide the anti-smudge function.

In addition, in some embodiments, the preferred range of the thickness of the anti-smudge layer 24 is between about 18 mm and about 25 nm. Such thickness may ensure that the anti-smudge layer 24 has excellent light transmittance not to affect the quality of the image. Moreover, because the rough surface 231 of the anti-glare layer 23 presents an undulating surface morphology, the surface roughness is about 200 nm for example, the ratio of the thickness of the anti-smudge layer 24 to the drop of the rough surface 231 is less than 10%. That is to say, compared with the anti-glare layer 23, the anti-smudge layer 24 is classified as a highly thin film structure. Therefore, in some embodiments, even though the anti-smudge layer 24 covers the rough surface 231 of the anti-glare layer 23, it will not fill the concave portions of the rough surface 231, such that the anti-smudge layer 24 itself forms an undulating rough surface similar to the surface morphology of the rough surface 231. Therefore, anti-glare effect due to the rough surface 231 is not affected.

On the other hand, the hydrophilicity and the hydrophobicity of the object surface are affected by the characteristics of the material itself and its surface roughness. In some embodiments, because organic siloxane and organic perfluoropolyether used for the anti-smudge layer 24 are both materials having hydrophobicity, and the anti-smudge layer 24 is formed on the rough surface 231 thus to form the same rough surface, the hydrophobicity and anti-smudge properties of the anti-smudge layer 24 may be improved by the properties of these materials and the structural match of the rough surface, and the anti-reflection and anti-glare effects due to the anti-reflective layer 22 and the anti-glare layer 23 are not affected either. Thus, the touch-sensitive device 2 provides anti-reflection, anti-glare, anti-smudge, and abrasion resistance effects by the anti-reflective layer 22, the anti-glare layer 23, and the anti-smudge layer 24. Moreover, the anti-smudge layer 24 is formed on the rough surface rather than a smooth surface, so that preferable adhesion is between the anti-smudge layer 24 and the anti-glare layer 23, and the anti-smudge layer 24 will not easily fall off or be peeled off by a touch or a slide of a user.

It is noted that, as to the implementation of the anti-smudge layer 24, although it is only described in some embodiments, the structure of the anti-smudge layer 24 may also be directly and unambiguously applied to other embodiments, and it is not limited to the embodiments described above with respect to FIG. 2.

Figure 3:
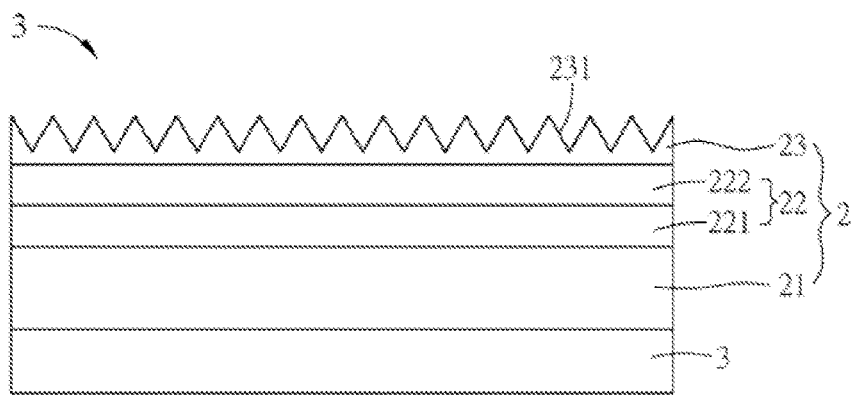
FIG. 3 is a schematic diagram illustrating some embodiments of the touch-sensitive device according to the disclosure.

Third Device:

FIG. 3 is a diagram of the touch-sensitive device 3 according to various embodiments of the disclosure. Compared with some embodiments, the touch-sensitive device 3 of FIG. 3 further includes a second anti-reflective film 222. The second anti-reflective film 222 is disposed between the first anti-reflective film 221 and the anti-glare layer 23, and has refractive index less than that of the first anti-reflective film 221 and not greater than that of the anti-glare layer 23. Moreover, the second anti-reflective film 222 and the first anti-reflective film 221 form the anti-reflective layer 22 of multiple layers.

Specifically, the second anti-reflective film 222 of FIG. 3 mainly uses silicon oxide or magnesium fluoride as its material and it is formed by evaporation or sputtering. The refractive index of the second anti-reflective film 222 is less than about 1.5, and the preferred range of the thickness is between about 10 nm to about 15 nm. So, in some embodiments, the refractive index of the second anti-reflective film 222 and the transparent substrate 21 are less than that of the first anti-reflective film 221 individually. Moreover, if the refractive index and the thickness of the second anti-reflective film 222 and the first anti-reflective film 221 are selected in a property proportion, the reflection problem of the transparent substrate 21 can be effectively alleviated.

On the other hand, in some embodiments, the second anti-reflective film 222 is formed by silicon oxide, and thus the second anti-reflective film 222 and the anti-glare layer 23 are formed of the same material. In manufacturing order, the second anti-reflective film 222 is formed prior to the anti-glare layer 23. Because the second anti-reflective film 222 is formed by evaporation, sputtering, and other vacuum coating, the strength of the adhesion between the second anti-reflective film 222 and the first anti-reflective film 221 can still be excellent, even though they are different materials. Then, when the anti-glare layer 23 is formed on the second anti-reflective film 222 by spraying, because the second anti-reflective film 222 and the anti-glare layer 23 are the same material, the strength of the adhesion between them can remain excellent. Therefore, if the second anti-reflective film 222 and the anti-glare layer 23 are both formed of silicon oxide, the relatively thin thickness of about 10 nm to about 15 nm described above may be used for forming the second anti-reflective film 222, and in this way, the second anti-reflective film 222, the anti-glare layer 23 and the first anti-reflective film 221 can be combined to form the anti-reflective structure of multiple layers. In some embodiments, the second anti-reflective film 222 not only acts as the optical film providing the function of anti-reflection but also further acts as the adhesive layer between the first anti-reflective film 221 and the anti-glare layer 23.

Figure 4:
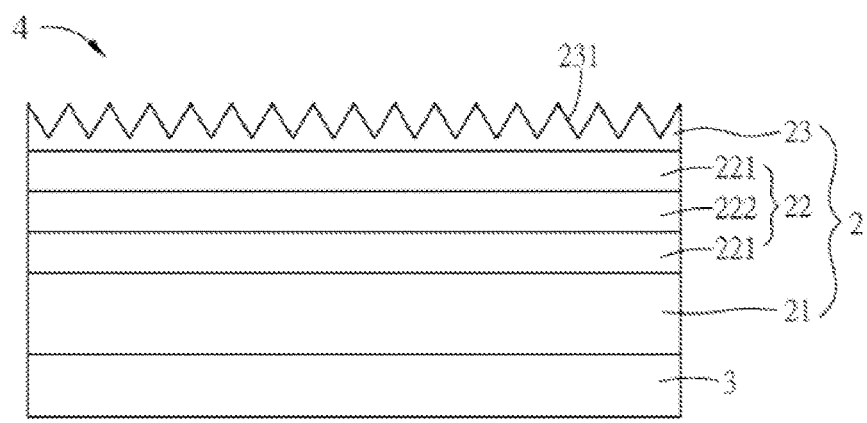
FIG. 4 is a schematic diagram illustrating some embodiments of the touch-sensitive device according to the disclosure.

Fourth Device:

FIG. 4 is a diagram of the touch-sensitive device 4 according to various embodiments of the disclosure. Compared with some embodiments, the first anti-reflective film 221 of FIG. 4 is double-layered, the first anti-reflective film 221 and the second anti-reflective film 222 are interlaced and stacked, and the second anti-reflective film 222 is sandwiched between two layers of the first anti-reflective film 221. According to some embodiments, two layers of the first anti-reflective film 221 are individually set for different thickness. Therefore, the transmittance of the incident light of different wavelengths is controlled, so that the anti-reflective layer 22 provides corresponding anti-reflection effect for the incident light of different wavelength ranges.

As to the first anti-reflective film 221 and the second anti-reflective film 222 described above, in addition to the two-layer and single-layer examples, other embodiments using more layers are also contemplated herein. The number of the first anti-reflective films 221 is more than one, and the number of the second anti-reflective films 222 is one less than the number of the first anti-reflective films 221. Namely, in some embodiments, the first anti-reflective films 221 and the second anti-reflective film 222 are interlaced and stacked, and the second anti-reflective film 222 is sandwiched between the first anti-reflective films 221 to provide relatively flexible implementation of the anti-reflective layer 22.

Figure 5:
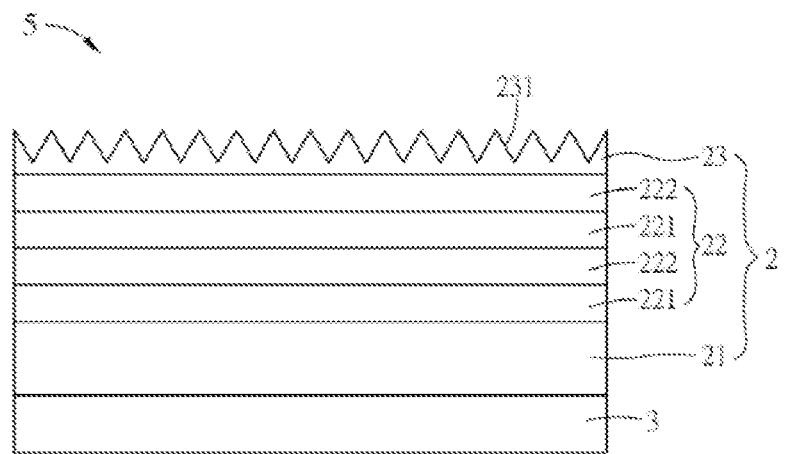
FIG. 5 is a schematic diagram illustrating some embodiments of the touch-sensitive device according to the disclosure.

Fifth Device:

FIG. 5 is a diagram of the touch-sensitive device 5 according to various embodiments of the disclosure. Compared with some embodiments, the second anti-reflective film 222 of the embodiment is two-layered, the first anti-reflective film 221 and the second anti-reflective film 222 are interlaced and stacked, the first anti-reflective film 221 is connected to the transparent substrate 21, and the second anti-reflective film 222 is connected to the anti-glare layer 23. Thus, the refractive index between the anti-glare layer 23, the first anti-reflective film 221, the second anti-reflective film 222, and the transparent substrate 21 remain matched, and the setting of the thickness between these structures is utilized, so that the anti-reflective layer 22 realizes an anti-reflective structure different from the above embodiments.

Similarly, the number of the first anti-reflective films 221 and the second anti-reflective films 222 is not limited to two layers as disclosed above. It is acceptable that the number of the first anti-reflective films 221 corresponds to the second anti-reflective films 222, the first anti-reflective film 221 is adjacent to the transparent substrate 21, and the second anti-reflective film 222 is adjacent to the anti-glare layer 23.

Moreover, similar to some embodiments, when the second anti-reflective film 222 is formed of silicon oxide, the preferred range of the thickness of the second anti-reflective film 222 adjacent to the anti-glare layer 23 is arranged to be between about 10 nm and about 15 nm, so that the anti-glare layer 23 and the second anti-reflective film 222 which are of the same material and adjacent to each other, cooperate to act as the anti-reflective structure together, and the second anti-reflective film 222 may act as the adhesive layer of the anti-glare layer 23 and the first anti-reflective film 221.

In summary of the above embodiments, the disclosure provides various implementations of the composite substrate structure 2 by various interactions of the anti-reflective layer 22, the anti-glare layer 23, and the anti-smudge layer 24 so as to provide the effect of anti-reflection, anti-glare, anti-smudge, and abrasion resistance for the touch-sensitive device 5.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A composite substrate structure, comprising:
   a transparent substrate;
   an anti-reflective layer disposed on the transparent substrate and having at least a first anti-reflective film, wherein the refractive index of the first anti-reflective film is greater than the refractive index of the transparent substrate;
   an anti-glare layer disposed on the anti-reflective layer, wherein:
      the anti-glare layer and the transparent substrate are respectively located at opposite sides of the anti-reflective layer,
      the refractive index of the anti-glare layer is less than the refractive index of the first anti-reflective film, and
      the anti-glare layer has a rough surface distant from the anti-reflective layer; and
   an anti-smudge layer having hydrophobicity and disposed on the rough surface of the anti-glare layer.

2. The composite substrate structure of claim 1, wherein:
   the anti-smudge layer has a rough surface distant from the anti-smudge layer, and
   the thickness of the anti-smudge layer is less than the thickness of the anti-glare layer.

3. The composite substrate structure of claim 1, wherein the main material of the anti-smudge layer is organic siloxane or organic perfluoropolyether.

4. The composite substrate structure of claim 2, wherein the thickness of the anti-smudge layer is between about 18 nm and about 25 nm.

5. The composite substrate structure of claim 1, wherein the contact angle of the anti-smudge layer is greater than about 90°.

6. The composite substrate structure of claim 1, wherein the anti-smudge layer is formed by spraying, evaporation, or sputtering to define an interface where the anti-smudge layer contacts the anti-glare layer.

7. The composite substrate structure of claim 1, wherein:
   the anti-reflective layer further comprises a second anti-reflective film disposed between the first anti-reflective film and the anti-glare layer, and
   the refractive index of the second anti-reflective film is less than the refractive index of the first anti-reflective film and is not greater than the refractive index of the anti-glare layer.

8. The composite substrate structure of claim 7, wherein:
the main material of the first anti-reflective film is niobium oxide, titanium oxide, tantalum oxide, silicon oxynitride, or silicon nitride, and
the main material of the second anti-reflective film is silicon oxide or magnesium fluoride.

9. The composite substrate structure of claim 7, wherein:
the refractive index of the first anti-reflective film is greater than about 1.8, and
the refractive index of the second anti-reflective film is less than about 1.5.

10. The composite substrate structure of claim 7, wherein:
the thickness of the first anti-reflective film is between about 115 nm and about 245 nm, and
the thickness of the second anti-reflective film is between about 10 nm and about 110 nm.

11. The composite substrate structure of claim 7, wherein a material composition of the first anti-reflective film is different than a material composition of the second anti-reflective film.

12. The composite substrate structure of claim 1, wherein:
the number of the first anti-reflective films is more than one,
the anti-reflective layer further has at least a layer of second anti-reflective film,
the number of the second anti-reflective films is one layer less than the number of the first anti-reflective films,
the second anti-reflective film and the first anti-reflective films are interlaced and stacked to be sandwiched between the first anti-reflective films,
the refractive index of the second anti-reflective film is less than the refractive index of the first anti-reflective films and is not greater than the refractive index of the anti-glare layer;
the anti-glare layer directly contacts one of the first anti-reflective films; and
the transparent substrate directly contacts another one of the first anti-reflective films.

13. The composite substrate structure of claim 1, wherein:
the number of the first anti-reflective films is more than one,
the anti-reflective layer further has second anti-reflective films,
the number of the second anti-reflective films corresponds to the first anti-reflective films,
the first anti-reflective films and the second anti-reflective films are interlaced and stacked,
one of the first anti-reflective films directly contacts the transparent substrate,
one of the second anti-reflective films directly contacts the anti-glare layer, and
the refractive index of the second anti-reflective films is less than the refractive index of the first anti-reflective films and is not greater than the refractive index of the anti-glare layer.

14. The composite substrate structure of claim 1, wherein the thickness of the anti-reflective layer is between about 225 nm and about 255 nm.

15. The composite substrate structure of claim 1, wherein the main material of the anti-glare layer is silicon dioxide.

16. The composite substrate structure of claim 1, wherein the thickness of the anti-glare layer is not greater than about 100 nm.

17. The composite substrate structure of claim 1, wherein:
the surface roughness of the rough surface of the anti-glare layer is not greater than about 100 nm, and
the value of the surface roughness is not greater than the thickness of the anti-glare layer.

18. The composite substrate structure of claim 1, wherein the first anti-reflective film is in direct contact with the transparent substrate and the anti-glare layer.

19. A composite substrate structure, comprising:
a transparent substrate;
an anti-reflective layer disposed on the transparent substrate and having at least a first anti-reflective film and at least a second anti-reflective film, wherein:
the first anti-reflective film and the second anti-reflective film are interlaced and stacked, and
the first anti-reflective film is connected to the transparent substrate;
an anti-glare layer having a rough surface distant from the anti-reflective layer, wherein the anti-glare layer and the transparent substrate are respectively located at opposite sides of the anti-reflective layer; and
an anti-smudge layer having hydrophobicity and disposed on the anti-glare layer, wherein:
the anti-smudge layer and the anti-reflective layer are respectively located at opposite sides of the anti-glare layer,
a refractive index of the first anti-reflective film is greater than a refractive index of the second anti-reflective film and a refractive index of the transparent substrate, and
the refractive index of the second anti-reflective film is not greater than a refractive index of the anti-glare layer.

20. A touch-sensitive device, comprising:
a composite substrate structure, comprising:
a transparent substrate;
an anti-reflective layer disposed on the transparent substrate and having at least a first anti-reflective film and at least a second anti-reflective film, wherein:
the first anti-reflective film and the second anti-reflective film are interlaced and stacked, and
the first anti-reflective film is connected to the transparent substrate;
an anti-glare layer having a rough surface distant from the anti-reflective layer, wherein the anti-glare layer and the transparent substrate are respectively located at opposite sides of the anti-reflective layer;
an anti-smudge layer having hydrophobicity and disposed on the anti-glare layer, wherein:
the anti-smudge layer and the anti-reflective layer are respectively located at opposite sides of the anti-glare layer, and
the anti-smudge layer has a rough surface distant from the anti-glare layer,
a refractive index of the first anti-reflective film is greater than a refractive index of the second anti-reflective film and a refractive index of the transparent substrate, and
the refractive index of the second anti-reflective film is not greater than a refractive index of the anti-glare layer; and
a touch-sensing unit disposed on a side of the transparent substrate opposite a side on which the anti-reflective layer and the anti-glare layer are disposed.

* * * * *